United States Patent
Yohn et al.

(10) Patent No.: US 8,854,411 B2
(45) Date of Patent: Oct. 7, 2014

(54) LASER MARKING USING SCALABLE FONTS

(71) Applicant: Markem-Imaje Corporation, Keene, NH (US)

(72) Inventors: Andrew Yohn, Swanzey, NH (US); Mark Rapposelli, Peterborough, NH (US); Kevin Franklin, San Diego, CA (US)

(73) Assignee: Markem-Imaje Corporation, Keene, NH (US)

( * ) Notice: Subject to any disclaimer, the term of this patent is extended or adjusted under 35 U.S.C. 154(b) by 6 days.

(21) Appl. No.: 13/942,476

(22) Filed: Jul. 15, 2013

(65) Prior Publication Data

US 2013/0300814 A1   Nov. 14, 2013

Related U.S. Application Data

(63) Continuation of application No. 13/098,207, filed on Apr. 29, 2011.

(60) Provisional application No. 61/329,935, filed on Apr. 30, 2010.

(51) Int. Cl.
  *B41J 2/435* (2006.01)
  *B41J 2/44* (2006.01)
  *B23K 26/00* (2014.01)

(52) U.S. Cl.
  CPC ............ *B41J 2/442* (2013.01); *B23K 26/0066* (2013.01)
  USPC .......................................... 347/262; 347/264

(58) Field of Classification Search
  CPC .......... B41J 2/4753; B41J 2/471; B41J 2/442; B41J 2/315; B41J 3/407; B41J 2/47
  USPC .................................. 347/224, 225, 262, 264
  See application file for complete search history.

(56) References Cited

U.S. PATENT DOCUMENTS

| | | | |
|---|---|---|---|
| 4,803,336 A | 2/1989 | Myer | |
| 5,015,106 A | 5/1991 | Robertson et al. | |
| 5,837,962 A | 11/1998 | Overbeck | |
| 6,201,210 B1 | 3/2001 | Sans I Ravellat et al. | |
| 7,009,633 B2 | 3/2006 | Steenackers | |
| 2006/0012667 A1* | 1/2006 | Franklin | 347/225 |
| 2006/0256358 A1 | 11/2006 | Chapman et al. | |
| 2008/0023455 A1 | 1/2008 | Idaka et al. | |
| 2010/0039916 A1* | 2/2010 | Hasegawa et al. | 369/100 |

OTHER PUBLICATIONS

Young, Lee W., Authorized Officer, PCT Office, PCT International Application No. PCT/US11/34520, filed Apr. 29, 2011, in International Search Report, mailed Aug. 18, 2011, 8 pages.

(Continued)

*Primary Examiner* — Justin Seo
*Assistant Examiner* — Kendrick Liu
(74) *Attorney, Agent, or Firm* — Fish & Richardson P.C.

(57) ABSTRACT

A system directs a laser beam to mark a material with an alphanumeric code. Character and quality information corresponding to a mark to apply to the material with the laser beam can be received, a font definition that specifies character segments can be obtained, a set of multiple spaced locations can be generated from the character segments in accordance with the character and quality information, and the material can be marked with the laser beam by directing the laser beam to dwell at the locations and move between the locations without deactivating the laser beam.

21 Claims, 15 Drawing Sheets

(56) References Cited

OTHER PUBLICATIONS

Anti-Grain Geometry, "Adaptive Subdivision of Bezier Curves: An attempt to achieve perfect result in Bezier curve approximation", Jul. 2005, 23 pages.

Microsoft typography—Features of TrueType and Open Type, "Specifications—overview", http://www.microsoft.com/typography/SpecificationsOverview.mspx, downloaded Apr. 27, 2011, 1 page.

* cited by examiner

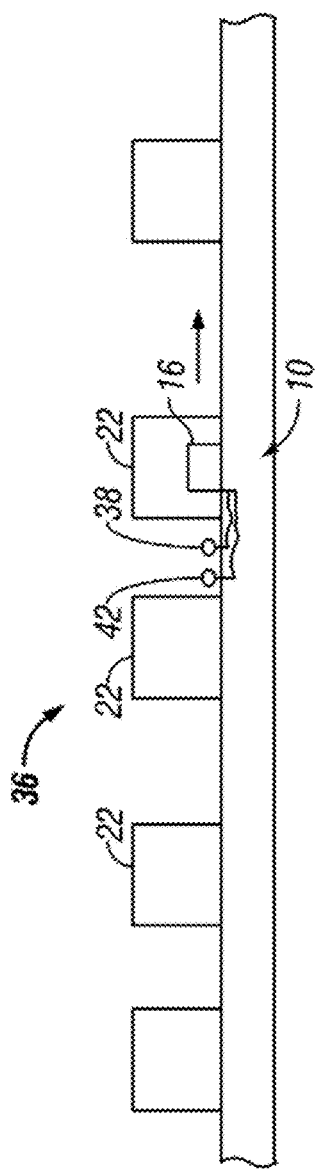
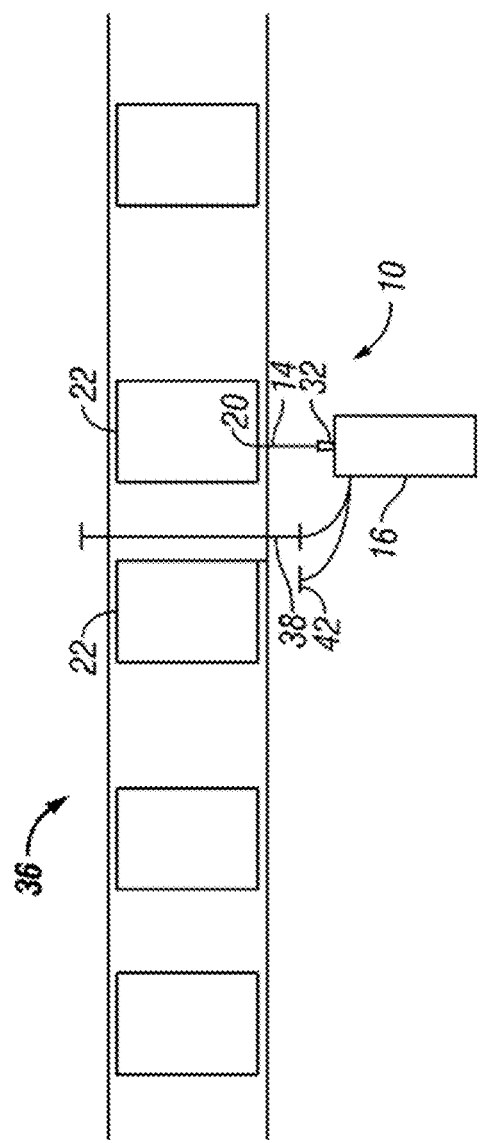

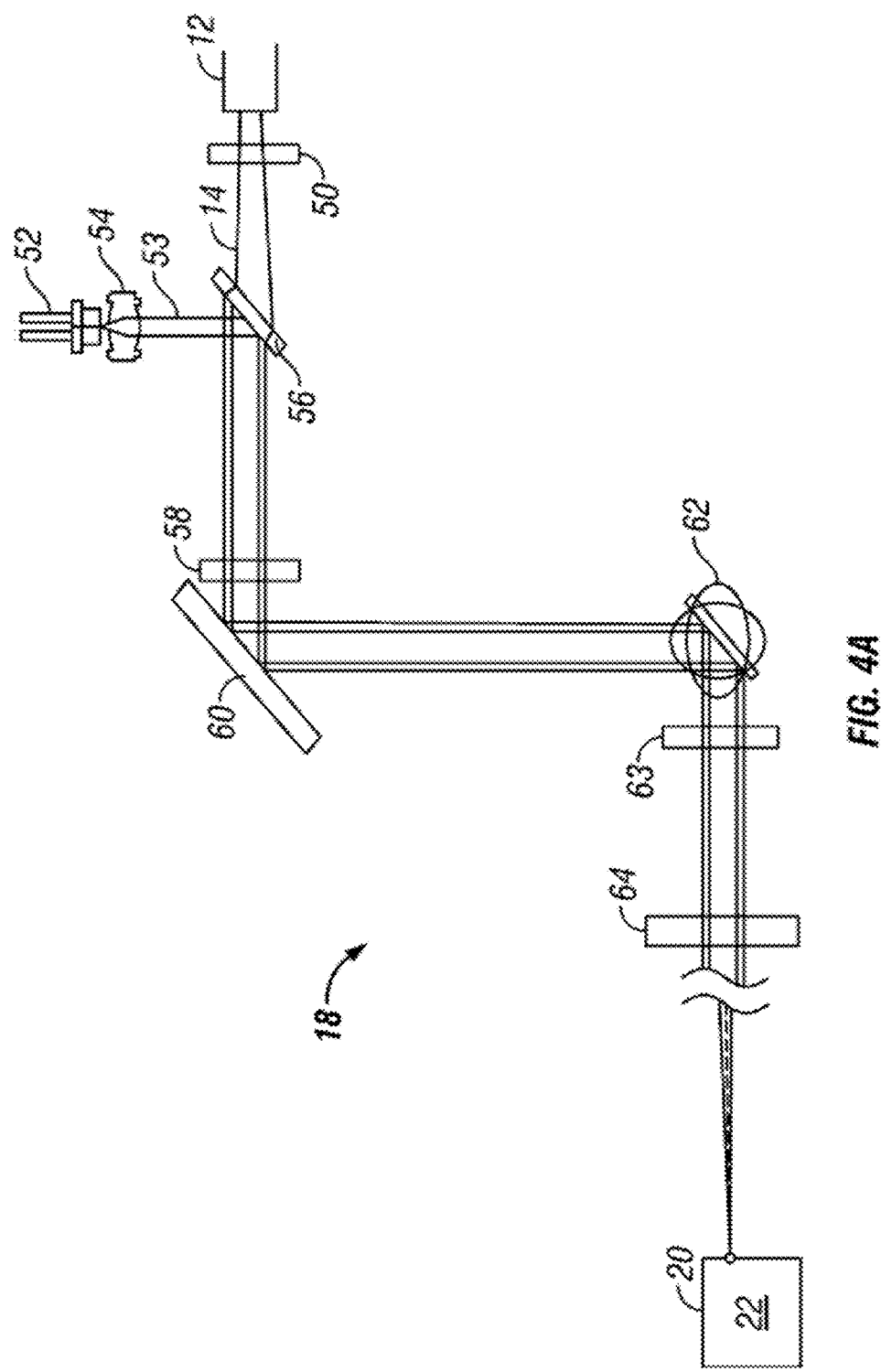

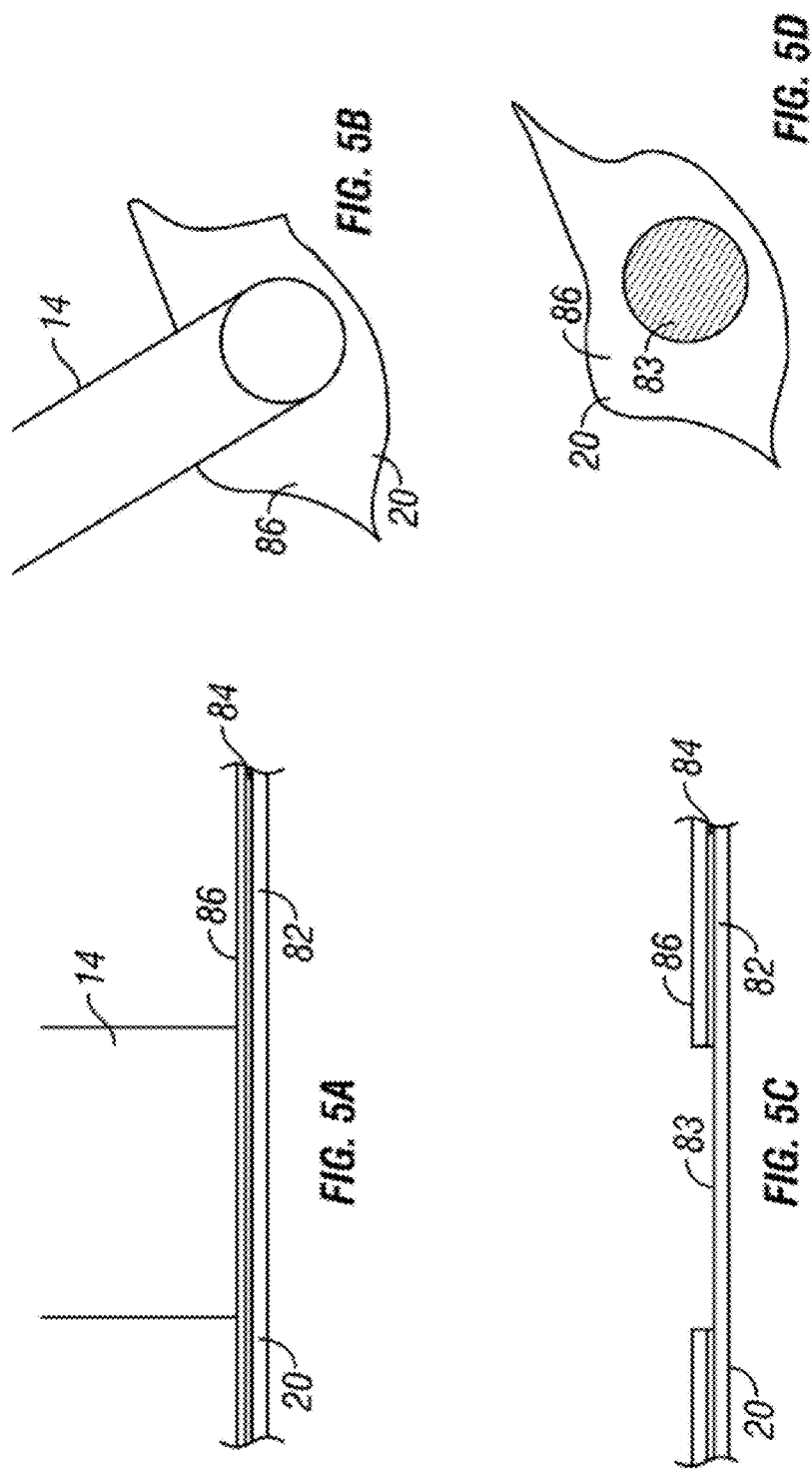

LASER MARKING USING SCALABLE FONTS

CROSS REFERENCE TO RELATED APPLICATIONS

This application is a continuation of (and claims priority to) U.S. application Ser. No. 13/098,207, filed Apr. 29, 2011, which claims the benefit of the priority of U.S. Provisional Application Ser. No. 61/329,935, filed Apr. 30, 2010 and entitled "LASER MARKING USING SCALABLE FONTS".

BACKGROUND

Existing laser marking systems that employ step-and-repeat, variable dwell time laser printing to mark products (e.g., on a manufacturing assembly line) use font definitions that are specific to a given pixel grid. For example, previous laser font definitions were often restricted to a given pixel grid (e.g. 11×9, 7×5, etc.) and typically required selection of a font grid by a user based on a particular speed and quality point.

SUMMARY

The present disclosure relates to a system and method for laser marking using scalable fonts. The system can include a software application that converts character input data, using a scalable font definition, into a format that can be efficiently printed on a product by a laser printing system. This can result in improved image quality for dot matrix laser marks, minimization of perforation risk for laser on film (e.g., thin film packaging for food products), and further development of scalable, adjustable laser fonts. These scalable laser fonts can provide the user with the ability to tradeoff marking speed and image quality with a single font definition. The higher resolution provides more flexibility in choosing pixel locations, allowing the system to space pixels more uniformly, while increasing the number of pixels allows more visually appealing character shapes.

The uniform pixel spacing can also create a more consistent mark, allowing the user to reduce laser power and the attendant risk of film puncture. To resolve the issue of maintaining multiple fonts which do not scale, a new font definition can be introduced. This definition defines each segment of a character instead of individual pixels, where segments can include straight lines, curved lines and points. At job design time, the user specifies the character size and quality setting (e.g., pixel spacing) to print. Based on the segment information, pixels at the correct spacing are derived to form a character of the correct size. This allows a single font to scale to any resolution and generate a dot matrix print with large spacing, or at a close uniform spacing to produce a more aesthetically pleasing print.

The software application and laser printing system may provide several advantages. High resolution scalable dot matrix fonts can be defined with uniform spacing that is more visually appealing than traditional dot matrix fonts. This can result in a dot matrix mark that includes the continuous appearance of a vector drawn laser mark, but can nonetheless be drawn using constant sweep speeds. This reduces the risk of substrate puncture. Moreover, the font definition allows variation (while maintaining the same font) in print quality, thus enabling speed versus print quality tradeoffs at the last minute without changing fonts. Note that the spacing between dots can be consistently maintained regardless of the size (height and width) of the printed characters rendered with the font. Moreover, characters can be made more attractive and be formed with fewer pixels at lower or the same fluence, which can increase the maximum speed for using the laser marking system. Thus, the application space for the laser marking system can be increased while the mark quality is also improved.

An aspect relates to a method of marking on a material with a laser beam, where the method includes: receiving character and quality information corresponding to a mark to apply to the material with the laser beam; obtaining a font definition that specifies character segments; generating from the character segments a set of multiple spaced locations in accordance with the character and quality information; and marking the material with the laser beam by directing the laser beam to dwell at the locations and move between the locations without deactivating the laser beam. Note that obtaining the font definition can include loading the font definition from memory responsive to a user input.

Receiving the character and quality information can include: loading character information from a memory responsive to a user input, and receiving a quality setting from a user interface; and generating the set of multiple spaced locations from the character segments can include: spacing the locations within the character segments based on the received quality setting. Further, receiving the character and quality information can include receiving character size information, and generating the set of multiple spaced locations can include generating the set of multiple spaced locations in a pixel grid selected in accordance with the character size information.

Another aspect relates to a system to mark a material with a laser beam. The system includes: a laser operable to produce the laser beam; an optics assembly operable to focus and direct the laser beam; and one or more data processing machines, such as a computer, coupled with the laser and the optics assembly. A computer can execute a software application stored on a machine-readable medium to perform operations. The one or more machines coupled with the laser and the optics assembly can be operable to receive character and quality information corresponding to a mark to apply to the material with the laser beam, obtain a font definition that specifies character segments, generate from the character segments a set of multiple spaced locations in accordance with the character and quality information, and mark the material with the laser beam by directing the laser beam to dwell at the locations and move between the locations without deactivating the laser beam.

The one or more machines can include a memory and be operable to obtain the font definition by loading the font definition from the memory responsive to a user input. Further, the one or more machines can be operable to receive character information from a saved project file and receive a quality setting through a user interface, and the one or more machines can be operable to generate the set of multiple spaced locations by spacing the locations within the character segments based on the received quality setting.

Details of one or more implementations are set forth in the accompanying drawings and the description below, in which the present systems and techniques are described in connection with a continuous wave laser in a step-and-repeat, variable dwell time laser printing system. It should be appreciated that the laser marking systems and techniques described are equally applicable to laser marking outside of the continuous wave mode.

Other features and advantages may be apparent from the description and drawings, and from the claims.

BRIEF DESCRIPTION OF THE DRAWINGS

FIG. 3B is a side view of a printing system used in conjunction with a product line which continuously moves a product in front of the printing system.

FIG. 3C is a top view of the printing system of FIG. 3B used in conjunction with a product line which continuously moves the product in front of the printing system.

FIG. 4A illustrates an example optical assembly for use in the printing system of FIG. 1A.

FIG. 5A is a side view of a printing beam being incident on a material at a location where a spot is to be formed on the material.

FIG. 5B is a perspective view of a printing beam being incident on a material at a location where a spot is to be formed on the material.

FIG. 5C is a side view of a material after the printing beam has formed a spot in the material.

FIG. 5D is a perspective view of a material after the printing beam has formed a spot in the material.

DETAILED DESCRIPTION

The present application relates to a printing system for printing an image on a surface, such as a surface of a product (e.g., the product item, its packaging, a label, etc.) positioned adjacent to the printing system. The printing system includes a laser for producing a printing beam. An optics assembly steers the printing beam from one location to another location. The printing system can include electronics for adjusting the time that the printing beam dwells at each location. This dwell time can be adjusted such that the printing beam causes a spot to be formed at each location.

The locations can be arranged such that the spots form an image or graphic, such as a company logo or trademark. The locations can also be arranged to form symbols or codes, which may be part of the image or separate from the image. The symbols may be available in word processing programs such as alphanumeric symbols and any other symbols used to identify a product batch, date, etc. A sequence or code to be printed may include such symbols and can be readable text such as product names or identifiers. The codes to be printed need not be alphanumeric and can include symbols which are not produced by typical word processing programs. For instance, the images, symbols and/or codes produced can include bar codes and complex graphic characters.

Figures 1A, 1B:
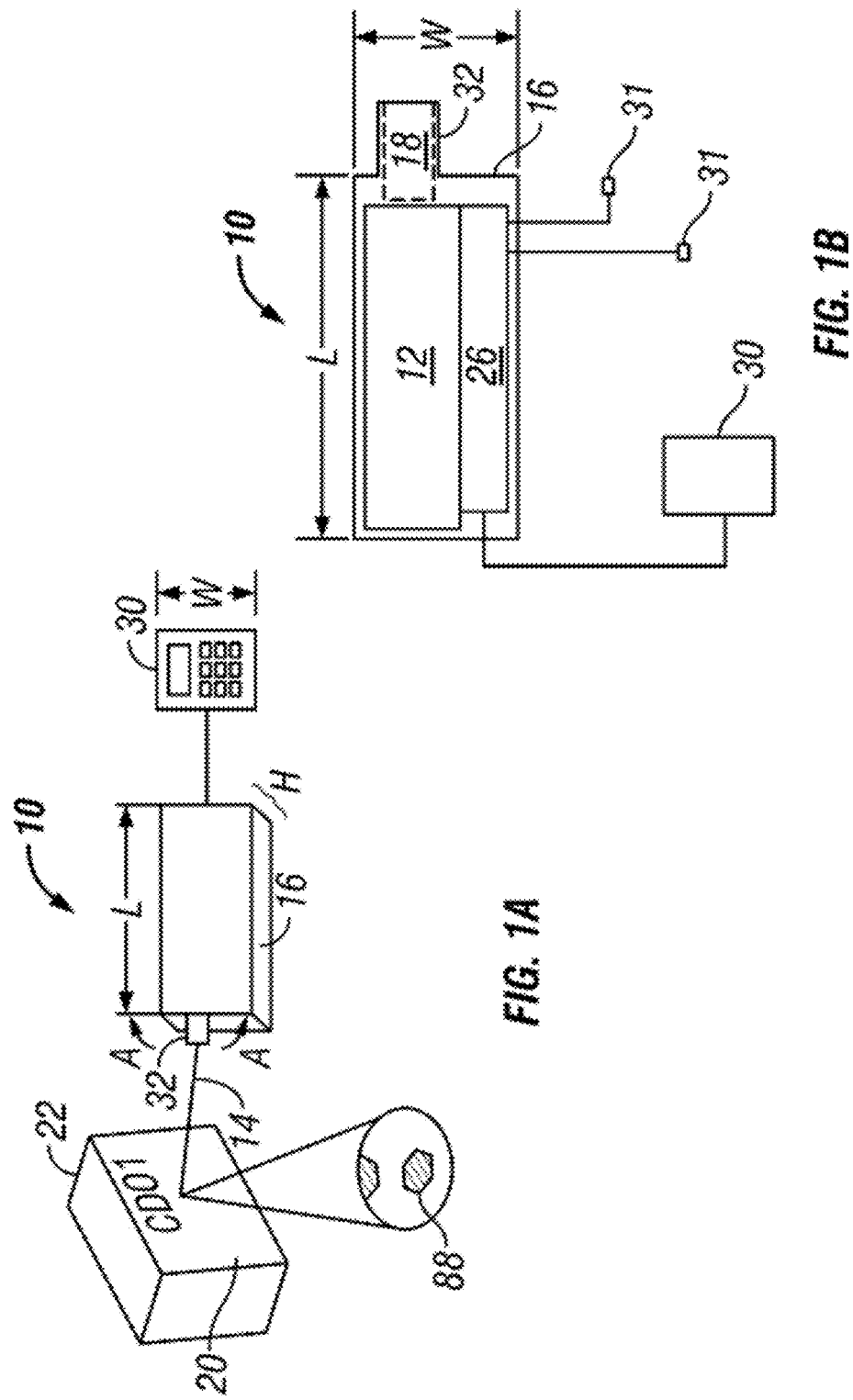
FIG. 1A is a side view of an example printing system.
FIG. 1B is a cross-section of the printing system of FIG. 1A looking down on to the printing system.

FIGS. 1A and 1B illustrate an example printing system 10 for printing on a product 22 positioned adjacent to the printing system 10. FIG. 1A is a side view of the printing system 10, while FIG. 1B is a cross sectional top view of the printing system 10. The printing system 10 includes a laser 12 for producing a printing beam 14. Many types of lasers can be used in the printing system. Since the dwell time can be increased in order to compensate for reduced laser power, a low powered laser can be employed in the printing system. For instance, the laser 12 can be a $CO_2$ air-cooled laser. In some instances, the laser may be a 50-Watt laser, a 30-Watt laser, a 10-Watt laser, or less. In addition, the laser 12 can be a diode laser.

The printing beam 14 from the laser/energy source 12 passes through an optics assembly 18 and is incident on a material 20, such as the material used in product packaging. As will be described in more detail below, the time that the beam 14 is incident on the material 20 can be adjusted such that the beam 14 causes a spot to be formed on the material 20.

The optics assembly 18 includes components for altering the direction of the printing beam 14. These components can be controlled to steer the printing beam 14 from one location to another location so as to create a spot at each of the locations. The spots can be arranged to form one or more images or symbols on the material 20 of the product 22 using the techniques described below.

The printing system 10 also includes electronics 26 in communication with the laser/energy source 12 and the optics assembly 18. The electronics 26 can include one or more processors for providing the functionality to the printing system 10. Suitable processors include, but are not limited to, microprocessors, digital signal processors (DSP), integrated circuits, application specific integrated circuits (ASICs), logic gate arrays and switching arrays. The electronics 26 can also include one or more memories for storing instructions to be carried out by the one or more processors and/or for storing data developed during operation of the printing system 10. Suitable memories include, but are not limited to, RAM and electronic read-only memories (e.g., ROM, EPROM, or EEPROM). Real-time clocks can also be used in the system to assist in determining the specific codes to be marked, in combination with user-input information.

The electronics 26 control the operation of the laser 12 and the optics assembly 18. For instance, the electronics 26 can control the optics assembly 18 to adjust the direction of the printing beam 14, the length of time that the printing beam 14 dwells at a location on the material 20 where a spot is to be formed, the speed that the printing beam 14 moves between each location where the beam dwells, the size of spots used to create visually recognizable symbols/images.

The electronics 26 can optionally be in communication with a user interface 30. The user interface 30 can be remote from the housing 16, attached to the housing 16 and/or detachable from the housing 16. The user interface 30 may be a handheld device. A suitable user interface 30 can include an alphanumeric keyboard and a display. The user interface 30 can be used to program the electronics 26 and/or set printing parameters. For instance, the user interface 30 can be used to manually control the time that the printing beam 14 dwells at a single location on the material 20, the size of the spots used to form a visually observable symbol, the type and/sequence of symbol which are formed, etc. The user interface 30 can also be used to manually activate the printing system 10. For instance, the user interface 30 can include a print key which causes the printing system 10 to print on the material 20. Sensors may also select among multiple images the specific image to be marked or specific parameters for the marking. For example, the specific symbols to be marked, the laser power to be used in marking, the specific dwell-time to be used, or combinations of these or other parameters can be determined based on sensor input.

The electronics 26 can also be in communication with one or more sensors 31. These sensors 31 can provide the electronics 26 with information about the products on which the printing system 10 is to print. For instance, the sensors 31 can indicate the location of a product 22 relative to the printing system 10, the direction that a product 22 is moving, when a moving product 22 has been stopped, and when a product 22 is in the correct position to be printed upon. Suitable sensors 31 (described below) may include, but are not limited to, a speed sensor for detecting the speed and/or direction that a product 22 is moving and a location sensor for indicating when a product 22 is positioned in front of the sensor 31.

The printing system 10 includes a printing beam exit member 32 through which the printing beam 14 exits the housing 16. The printing beam exit member 32 can be as simple as an opening in the housing 16 or an immobile window mounted in the housing 16. In another embodiment, the printing beam exit member 32 can be moved relative to the housing 16 as illustrated by the arrow labeled A. In this embodiment, the printing beam 14 can be manually aimed toward a particular position on the material 20 by manipulating the printing beam exit member 32.

Figure 2:
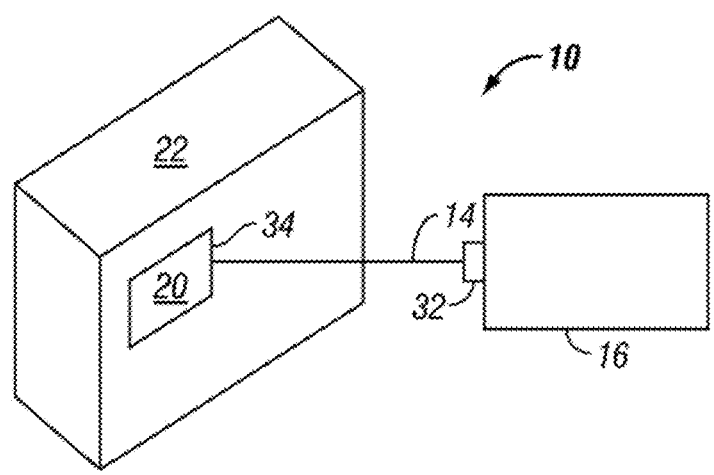
FIG. 2 illustrates the printing system of FIG. 1A forming a print zone upon a product.

FIG. 2 illustrates an example of the printing system 10 forming a print zone 34 upon a product 22. The printing system 10 can include components for defining the print zone 34 on the material 20. For instance, the printing system 10 can project a rectangle onto the material 20 as illustrated in FIG. 2. The printing system 10 forms the symbol of the code within the print zone 34.

During operation of the printing system 10, the print zone 34 may be printed automatically or be controlled by an operator. The operator may adjust the beam outlet member 32 so that the print zone 34 is formed at a desired location on the material 20. The user interface 30 is then used to activate print within the print zone 34. As a result, the operator of the printing system 10 can select where the printing system 10 prints a code on the material 20 by ensuring that the print zone 34 appears in the desired print location. Suitable print zone marks may include, but are not limited to, marks at the four corners of a print zone 34, a mark positioned in the center of the print zone 34, and a dashed line around the print zone 34.

In some implementations of the printing system 10, the electronics 26 control the size and geometry of the print zone 34. As a result, the electronics 26 can match the size and shape of the symbols to be printed on the material 20. For example, when an unusually large code is to be printed on the material 20, the electronics 26 can enlarge the print zone 34 so the code will be formed entirely within the print zone 34. As a result, an increase in the size of the code will not result in erroneous positioning of the code on the material 20.

Figure 3A:
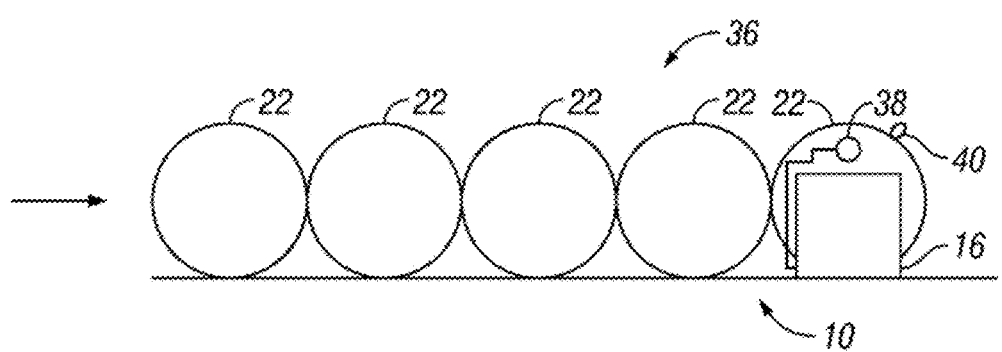
FIG. 3A is a side view of a printing system used in conjunction with a product line which temporarily stops a product in front of the printing system.

FIG. 3A illustrates a side view of the printing system 10 in operation with a product line 36 which temporarily stops the product 22 in front of the printing system 10. The printing system 10 can print on a stationary product 22 or on packaging located on a product line 36 which moves the product 22 relative to the printing system 10. The printing system 10 in FIG. 3A is in communication with a print trigger 38 which detects when one of the products 22 is positioned in front of the print trigger 38. A suitable print trigger 38 includes a device which produces a light beam. The device can be set up next to the product line 36 so that the product 22 disrupts the beam as the product 22 travels along the product line 36. The printing system 10 can monitor the device to determine when a product 22 has disrupted the beam. The print trigger 38 can be positioned such that when it has been triggered, the product 22 is correctly positioned for printing on the product 22. Alternatively, the print trigger 38 can be positioned such that when it has been triggered, the product 22 travels a specific distance before the product is correctly positioned for printing upon the product. The speed of the product's motion may affect that calculation so as to ensure the maximum utilization of the marking range (aperture) of the optics system, allowing the system to adjust for the widest possible range of product speeds while continuing to create an acceptable mark.

The printing system 10 can also be in communication with a stop mechanism 40, which stops each product 22 in front of the printing system 10. During operation of the product line 36, the stop mechanism 40 is withdrawn to allow the products 22 to move along the product line 36. The movement can result from one or more mechanical forces or one or more natural forces such as gravity. Once the product 22 has moved past the stop mechanism 40, the stop mechanism 40 is moved back into place to block the next product 22.

During operation of the printing system 10 illustrated in FIG. 3A, the products 22 pass before the printing system 10 on the product line 36. The printing system 10 monitors the print trigger 38 to determine when a product 22 has moved in front of the print trigger 38. The printing system 10 waits a pre-set delay to let the product 22 be pressed against the stop mechanism 40 and then prints the symbols on the packaging. As a result, the product 22 remains stationary while the printing system 10 prints the code on the packaging.

Once the code has been printed, the printing system 10 activates the stop mechanism 40 so the product 22 is again able to move. The printing mechanism monitors the print trigger 38 to find a gap between products 22. Once a gap is found, the printing system 10 activates the stop mechanism 40 to stop the next product 22 and again monitors the print trigger 38 to detect when the next product 22 has moved in front of the print trigger 38.

FIGS. 3B and 3C illustrate the printing system 10 in use with a product line 36 which continuously moves the product 22 past the printing system 10. The products 22 can be evenly or sporadically spaced on the line. The printing system 10 is in communication with a print trigger 38 and a speed sensor 42. The electronics 26 (FIG. 1B) can use signals from the speed sensor 42 to determine the speed and direction of the products 22 on the product line 36. Suitable speed sensors include, but are not limited to, encoders and resolvers.

While setting up the printing system 10, the distance between the printing system 10 and the print trigger 38 can be administratively entered into the electronics 26. In an alternative embodiment, the print trigger 38 is attached to the housing 16 so as to provide a fixed and known distance between the print trigger 38 and the printing beam 14. In this embodiment, the distance is known to the electronics 26 and does not need to be administratively entered.

During operation, the printing system 10 monitors the print trigger 38 to determine when a product 22 has moved in front of the print trigger 38. When it determines that a product 22 has moved in front of the print trigger 38, the printing system 10 determines the speed of the product 22 on the line 36 and uses this speed to determine a code position time delay. The code position time delay is determined such that the code is printed at a desired position on the product 22. A suitable method for determining this code position time delay is discussed below. Once the determined code position time delay has passed, the symbols are printed as the product 22 moves past the printing system 10.

Once the code is printed, the print trigger 38 may determine when the product 22 has moved past the print trigger 38. In some implementations, the print trigger 38 is always monitoring to identify when a new product 22 has moved in front of the print trigger 38. As shown in FIG. 3B, the print trigger 38 can be triggered by one product 22 while the printing system 10 is printing on another product 22. Hence, the printing system 10 may track the time delay for one of the products 22 while printing on another product 22. These situations can be handled with standard multi-task programming.

The printing system 10 can be used with other product lines 36. For instance, some product lines 36 include a labeling station for applying a label to a product 22. A labeling station typically includes electronics for determining when each product 22 has the label applied. The printing system 10 can be in communication with the labeling station and can print the code on each label after it has been applied to the product 22. The printing of the code can be triggered by the electronics within the label station. For instance, when the electronics of the label station detect that a label has been applied, these electronics can provide the printing system 10 with a signal indicating that the code should be printed. In other implementations, the code printing on the labels can be done before the label is applied.

FIG. 4A illustrates a top view of an optics assembly 18 in the printing system 10. The optics assembly 18 includes the laser source 12 for producing the printing beam 14. The printing beam 14 passes through a first negative lens 50, which expands the printing beam 14. The optics assembly 18 also includes a print zone light source 52 for producing a print zone beam 53, which passes through a second negative lens 54, which expands the print zone beam 53. Although the printing beam 14 and the print zone beam 53 are illustrated as being concurrently produced, the electronics 26 (FIG. 1B) can cause them to be produced independent of one another. Further, the print zone beam 53 is optional and need not be included in the optics assembly 18.

The printing beam 14 and the print zone beam 53 are combined at a beam combiner 56. The combined beams pass through a positive lens 58, which collimates the beams before they are turned at a reflector 60. The combined beams then pass to a plurality of mirrors 62 which reflect the combined beams toward a second positive lens 63, which focuses the combined beams. The combined beams then pass through a protective window 64 before passing to the product 22.

Figure 4B:
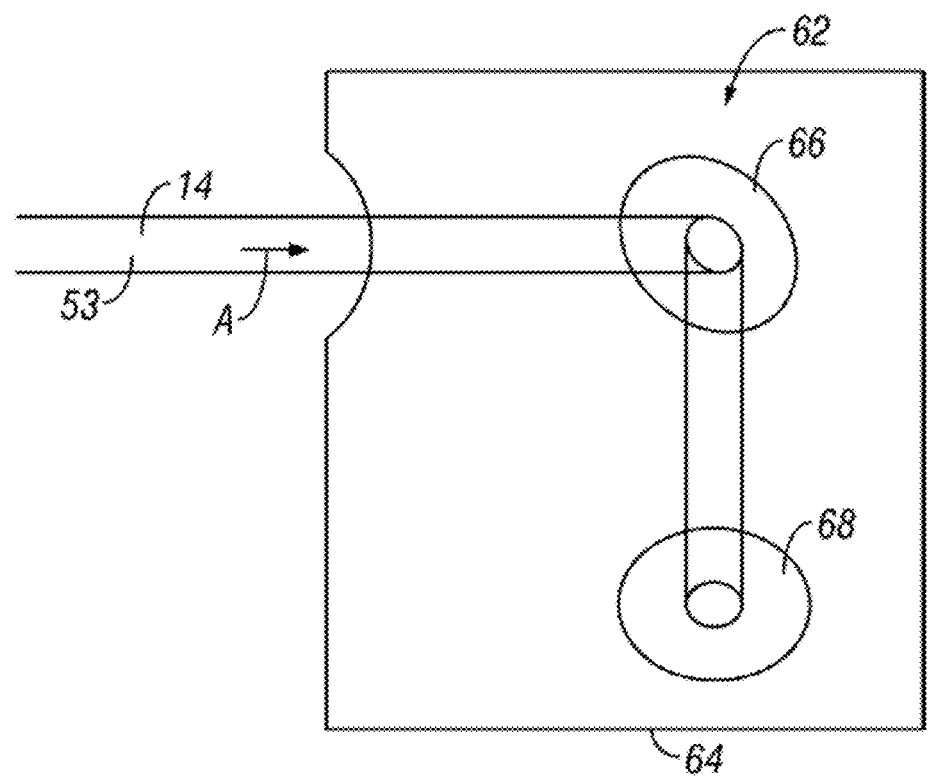
FIG. 4B is a side view of a plurality of mirrors of FIG. 4A configured to steer a printing beam produced by the printing system from one location to another on a product where a code is to be formed.

Because FIG. 4A is a top view of the optics assembly 18, and the mirrors 62 are positioned on top of one another, the arrangement of the mirrors 62 is not apparent from FIG. 4A. In order to clarify the arrangement of the mirrors, FIG. 4B provides a side view of the optics assembly 18 looking through the protective window 64. The combined beams 14, 53 approach the mirrors 62 from the left as illustrated by the arrow labeled A. The beams 14, 53 are reflected off a first mirror 66 down toward second mirror 68. The combined beams 14, 53 are reflected from the second mirror 68 out of the page.

Figure 4C:
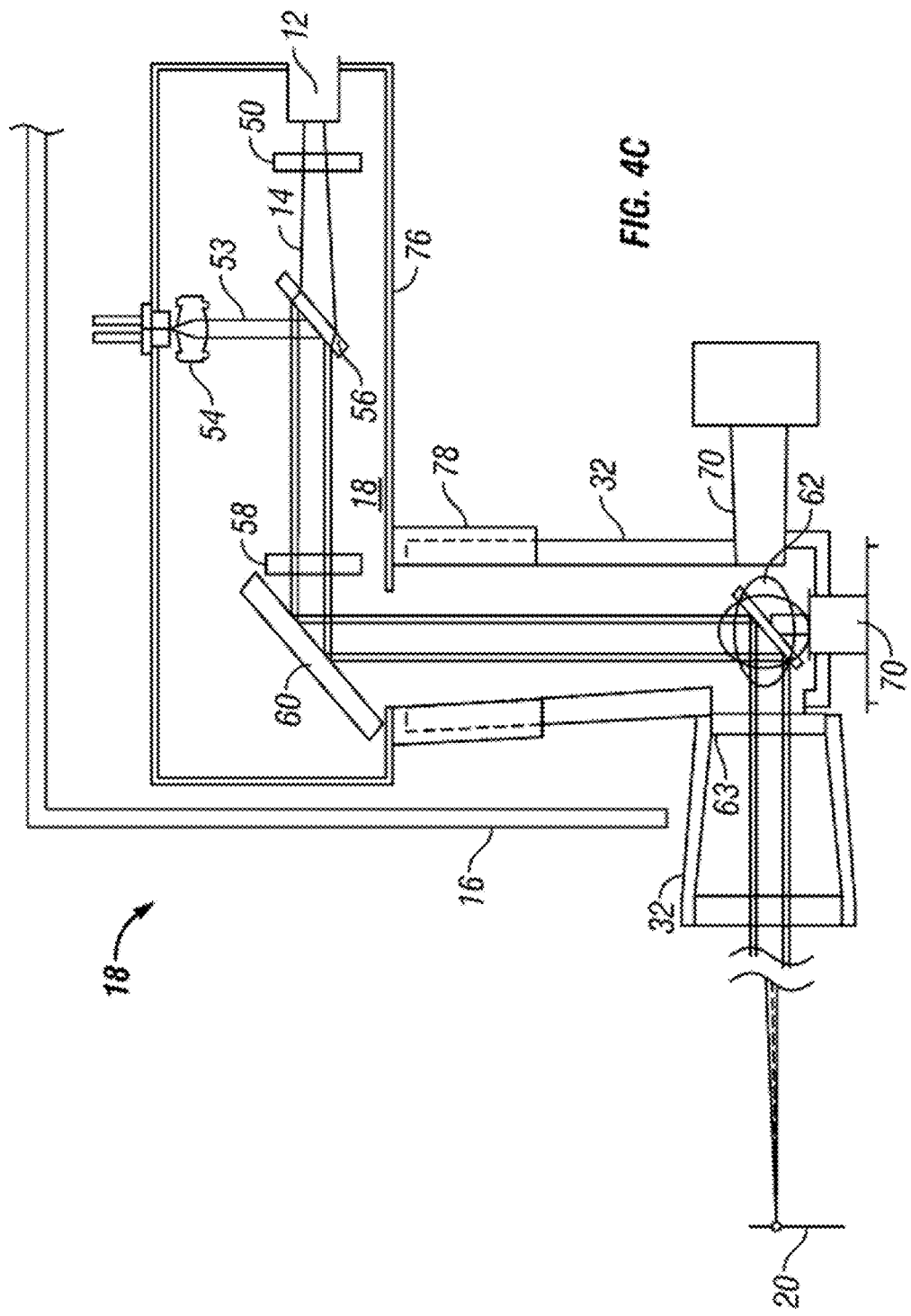
FIG. 4C illustrates the relationship between an optics assembly and a housing of the printing system of FIG. 4A.

As illustrated in FIG. 4C, one or both of the mirrors 62 can be coupled with one or more actuators 70 for moving the mirrors 62. Suitable actuators 70 include, but are not limited to, micromotors. The actuators 70 are controlled by the electronics 26 (FIG. 1B) to steer the beams 14, 53 to form symbols and the print zone 34 on the packaging. For instance, when the print zone 34 has a rectangular shape, the print zone beam 53 can trace a rectangle around the print zone 34 at a speed which causes the rectangle to appear solid to the human eye or at about 100 cycles/second.

Figure 4D:
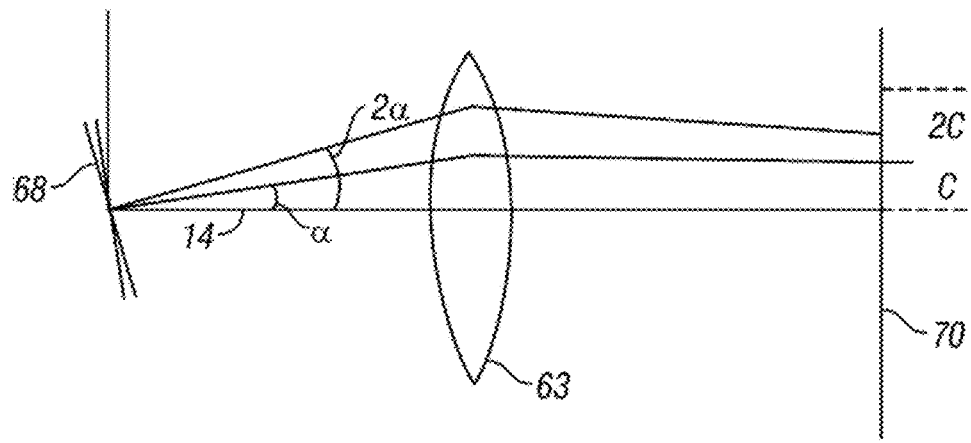
FIG. 4D illustrates the non-linear nature of a lens used in the optics assembly of FIG. 4A.

The second positive lens 63 of FIG. 4A can be a non-linear lens. FIG. 4D illustrates the second mirror 68 in a first position and a second position. In the first position, the angle between the printing beam 14 and a lens axis is $\alpha$, while in the second position this angle is doubled to $2\alpha$. Due to the non-linear nature of the lens 63, the printing beam 14 is incident on the product 22 at a distance, C, from the lens axis when the second mirror 68 in the first position. However, when the second mirror 68 is in the second position, the printing beam 14 is not incident on the product 22 at a distance, 2C, from the lens axis despite the angle being increased to $2\alpha$. The lack of proportionality between the movement of the mirror 68 and the movement of the printing beam 14 results from the non-linear nature of the lens 63.

The electronics 26 (FIG. 1B) can include logic which corrects for the effects of non-linearity of the second positive lens 63. Accordingly, this logic would cause the second mirror 68 to increase the angle by more than $2\alpha$ in order to move the printing beam 14 by 2C. Other, different relationships are also possible. The correction logic can be developed from theoretical optical equations providing a relationship between $\alpha$ and C for the second positive lens 63. The specific geometry of the optical steering subsystem, for example the mirrors and their arrangement, can be included in the theoretical model. Alternatively, the correction logic can be developed from experiments performed to determine the relationship between $\alpha$ and C. This correction logic eliminates the need for an expensive and large F-$\theta$ lens which is typically used to correct for non-linearity. Accordingly, this correction allows the size and cost of the printing system 10 to be reduced.

The effects of spherical aberration can be corrected with the variable dwell time. For instance, the dwell time may be increased when the effects of aberration are apparent on the product 22.

During operation of an optics assembly 18 including a printing zone light source 52, the print zone light source 52 is activated and the laser 12 is deactivated. The mirrors 62 are moved such that the print zone 34 is formed on the product 22. When the symbols are to be formed on the packaging, the print zone light source 52 is disengaged, and the laser/energy source 12 engaged until the symbols are formed. Once the symbols are formed, the laser/energy source 12 can be disengaged and the print zone light source 52 engaged in order to continue with formation of the print zone 34.

Figure 4E:
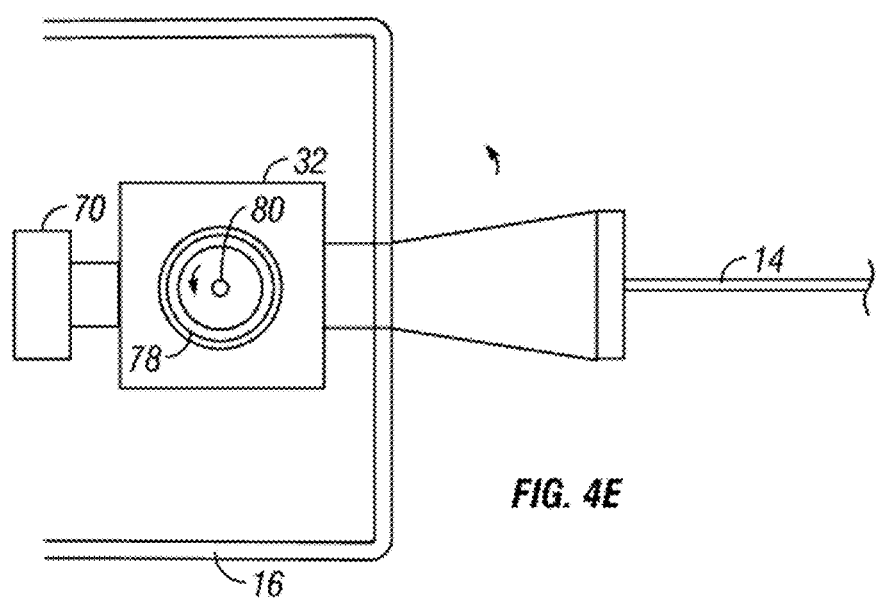
FIG. 4E illustrates a bearing of FIG. 4B which allows a printing beam exit member of the printing system to be rotated relative to a housing of the printing system.

As discussed above with reference to FIG. 1B, the printing system 10 can include a printing beam exit member 32 which can be moved relative to the apparatus housing 16. FIGS. 4C and 4E illustrate the mechanical arrangement which permits this movement of the printing beam exit member 32. A frame 76 in FIG. 4C supports the printing beam exit member 32 within the housing 16. A bearing 78 positioned between the frame 76 and the printing beam exit member 32 allows the printing beam exit member 32 to move relative to the frame 76. FIG. 4E provides a cross-sectional side view of the bearing 78 looking along the printing beam 14. The printing beam 14 passes through the bearing 78 (FIGS. 4C and 4E) along the axis of rotation 80 permitted by the bearing 78 (FIG. 4E), is reflected by the mirrors 62 (FIG. 4C) and passes through the end of the exit member 32 (FIGS. 4C and 4E). Hence, movement of the printing beam exit member 32 relative to the frame 76 does not change the position of the printing beam 14 relative to the bearing 78.

As illustrated in FIGS. 4C and 4E, the mirrors 62 and the actuators 70 are coupled with the printing beam exit member 32. As a result, the mirrors 62 and the actuators 70 move with the printing beam exit member 32 as the printing beam exit member 32 is moved relative to the housing 16. Further, a portion of the first mirror 66 (FIG. 4B) is positioned along the bearing's axis of rotation 80 (FIG. 4E). Hence, movement of the printing beam exit member 32 does not alter the angle of incidence between the printing beam 14 and the first mirror 66. Accordingly, when the printing beam exit member 32 is moved relative to the housing 16, the first mirror 66 still directs the printing beam 14 toward the same portion of the second mirror 68, and the printing beam 14 still exits the housing 16 through the same portion of the protective window 64. The rotatability of the printing beam exit member 32 relative to the housing 16 allows the printing beam 14 transmitted through the printing beam exit member 32 to be aimed at various positions on the product 22.

As described above, the printing beam 14 forms a plurality of spots at a variety of locations on the product 22 by remaining at the location until an optical characteristic of the location is altered. For illustrative purposes, FIGS. 5A-5D illustrate formation of a spot on a product 22 by removing a layer of ink from the product 22. FIGS. 5A and 5B illustrate the printing beam 14 incident on the material 20 at a particular location before a spot 83 (FIG. 5C) is formed on the material 20. The material 20 includes a substrate 82 such as paper. An ink layer 84 is formed on the substrate 82. The ink layer 84 can include several different ink types as well as several different colors as is apparent from the labels of many commercially available products 22. The material 20 illustrated in FIG. 5A includes an additional layer 86. The additional layer 86 represents the one or more layers which are often present over the ink layer 84 on product packaging. For instance, many materials 20, such as dog food bags, include a wax layer over the substrate 82 and ink layers 84.

FIGS. 5C-5D illustrate the material 20 after the spot 83 has been formed at the particular location on the material 20. The time that the printing beam 14 dwells at the particular location is adjusted such that the printing beam 14 has ablated the ink layer 84 and the additional layer 86 from the material 20 without burning the substrate 82. As a result, the substrate 82 is seen at the particular location on the material 20. The time to ablate an ink layer 84 is typically 100-500 µs.

The time to form the spot 83 is often a function of the materials 20 in the layers. For instance, the additional layer 86 can be a wax layer which protects the packaging and gives it an attractive appearance. Forming a spot 83 through such layers often requires more time than is required by the ink layer 84 alone.

The present application includes adjusting the time that the printing beam 14 dwells at a location such that a spot is formed at the location. In some instances, the dwell time is greater than 50 µs, such as 100 µs, 200 µs, 50-50,000 µs, 100-500 µs or 200-500 µs. In some instances, the diameter of the spot is less than 400 µm, less than 250 µm or less than 170 µm.

Figure 6:
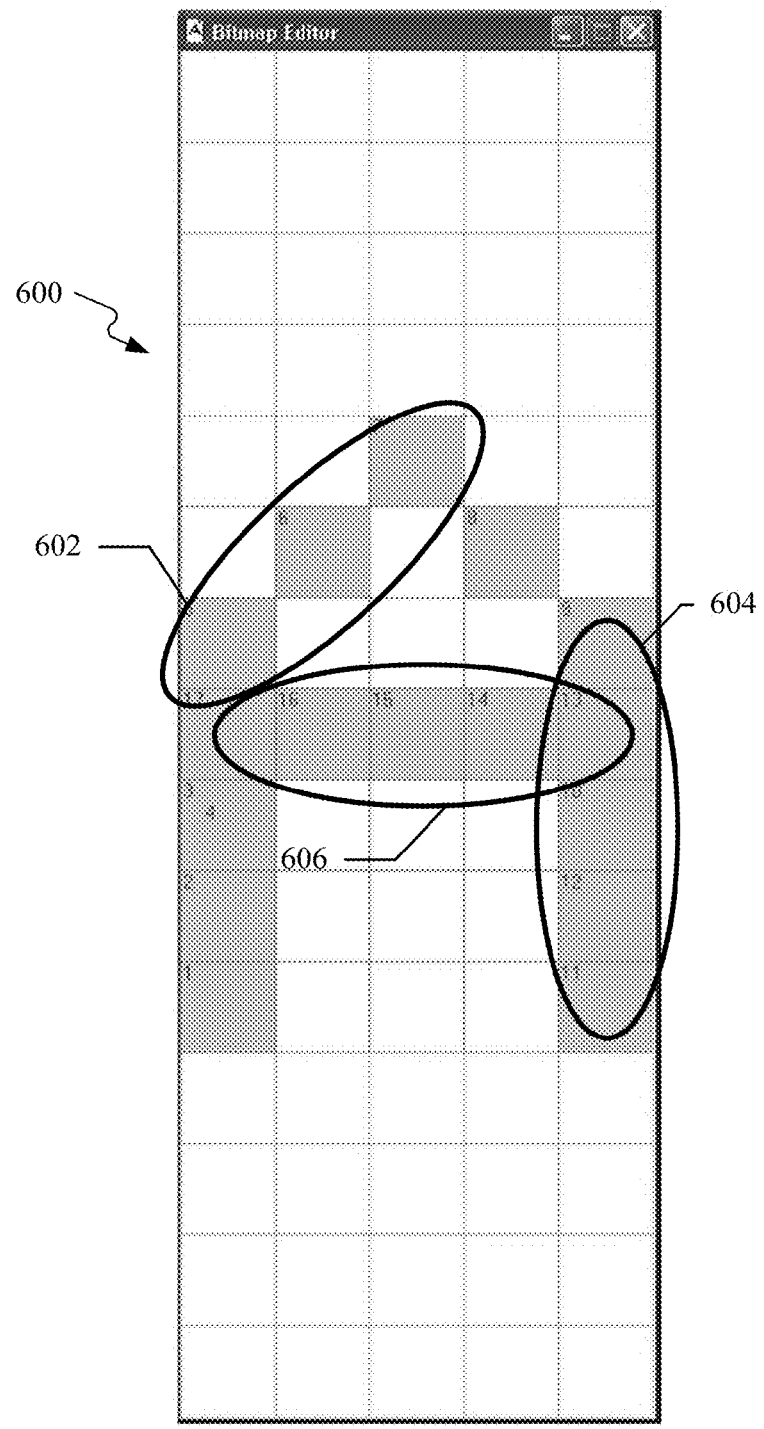
FIG. 6 illustrates a traditional font definition for the letter "A".

FIG. 6 illustrates a traditional font definition 600 for the letter "A". Mark quality includes subjective evaluation of character shapes. Existing laser fonts for step-and-repeat laser marking systems form characters reminiscent of low-resolution dot-matrix printers. Such laser marking systems mark pixels arranged on a grid pattern to form characters: 5×7, 7×9, 11×9 and 13×9 fonts are popular. These fonts form characters from horizontal, diagonal or vertical sequences of adjacent pixels. For example, the traditional font definition 600 shows how diagonal lines are formed at 45° only. Short 45° segments 602 alternate with vertical or horizontal segments 604, 606 to form other angles. This results in jagged diagonal lines and poorly formed curves that degrade the visual quality of the laser marks for alphanumeric characters.

When the characters marked are large, each spot is distinct and adjacent spots do not overlap. However, many customers mark smaller characters and adjacent pixels do overlap in most applications. When adjacent pixels overlap, the fluence delivered to the overlapping area is up to 40% less for diagonal pixels than for horizontal or vertical pixels due to the greater distance between diagonal pixels (the square root of two times the distance between horizontal or vertical pixels) in a scaled up version of a traditional laser font. The greater the amount of overlap, the more significant this affect. For consistent mark quality, the fluence should be high enough to mark diagonals. That means customers should use up to 40% more fluence than required for horizontal and vertical marking. For sensitive substrates like packaging film, this increases the risk of punctures. While a font's pixels may overlap when printed at one size, they will not at another. This results in inconsistent prints using the same font at different sizes (they do not scale effectively).

In part to improve the consistency and quality of laser marking, a scalable laser font is introduced. Rather than maintain and make a user work with multiple, individual fonts (e.g., 5×7, 7×9, 11×9, and 13×9 fonts), a single scalable font can replace these multiple fonts and can be readily converted into an appropriate pixel grid as needed based on character size and quality settings. This can result in improved mark appearance while also reducing the risks of substrate puncture, especially for packaging film. Punctures degrade film integrity, performance and can negatively affect the customer's product. Packaging films represent a large and growing segment of the packaging industry and film punctures can limit the usability of laser marking systems in this field.

Figure 7:
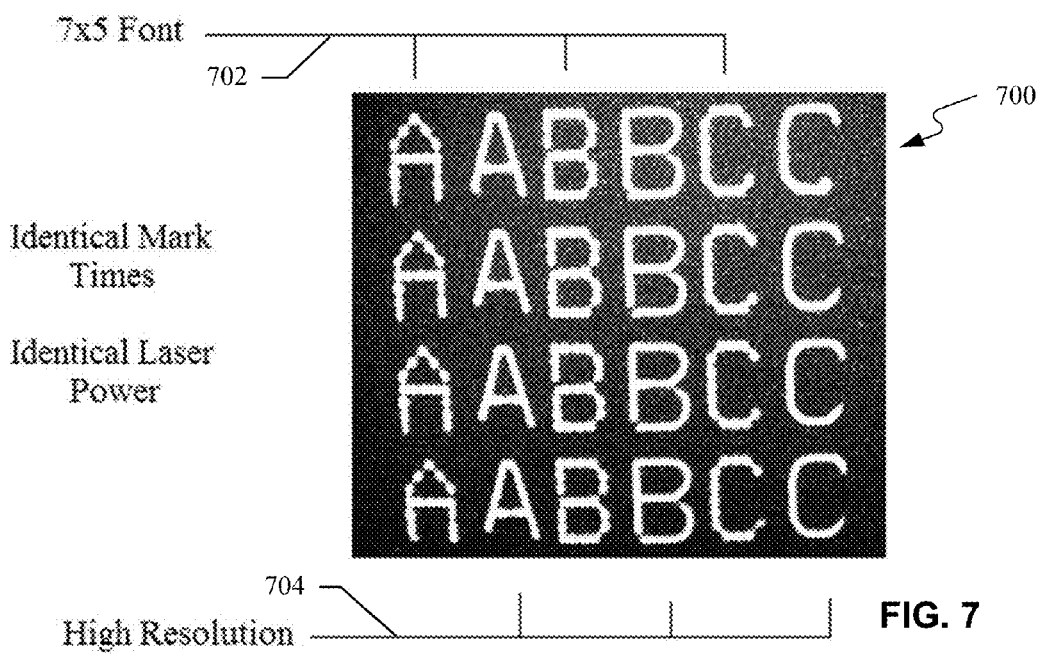
FIG. 7 shows results of laser marking using a traditional font definition and a new scalable font definition.

FIG. 7 shows results of laser marking using a traditional font definition and a new scalable font definition. The laser marking system can be designed to support higher resolution fonts that empower font designers to avoid marking adjacent pixels. For example, consider marking 2 mm tall by 1.2 mm wide characters. The 11×9 font marks with a vertical spacing of 0.16 mm and a horizontal spacing of 0.12 mm, which may be below the nominal 0.180 mm spot size of the system. These marks overlap and form a continuous line. Diagonal marks are spaced 0.22 mm apart, above the nominal spot size, and no longer form a continuous line.

A 40×25 font using twice the number of pixels spaced uniformly avoids this problem. The higher resolution provides more flexibility in choosing pixel locations, allowing the font designer to space pixels more uniformly, while doubling the number of pixels allows more visually appealing character shapes. The dwell time can be reduced to offset the increased number of pixels. In this example, the high resolution font 704 was marked at half the dwell of the 7×5 font 702, but the mark times and laser power were the same. The uniform pixel spacing creates a more consistent mark, as shown, and allows the user to reduce laser power and the attendant risk of film puncture.

To resolve the issue of maintaining multiple fonts which do not scale, a new font definition is introduced. This definition defines each segment of a character instead of individual pixels, where segments can include straight lines, curved lines and points. At job design time, the user can specify the character size and quality (e.g., pixel spacing) to print. Based on the segment information, marking locations at the correct spacing are derived to form a character of the correct quality at a given size. This allows a single font to scale to any size and generate a dot matrix print with large spacing, or at a close uniform spacing to produce a more aesthetically pleasing print. Moreover, the font and size information can be determined in advance for a given mark and saved in a project file for a later marking project run on an assembly line, and the font definition allows variation in print quality (while maintaining the same font from the same project file) to be set at the last minute, enabling speed versus print quality tradeoffs for a given laser marking project run.

Figure 8:
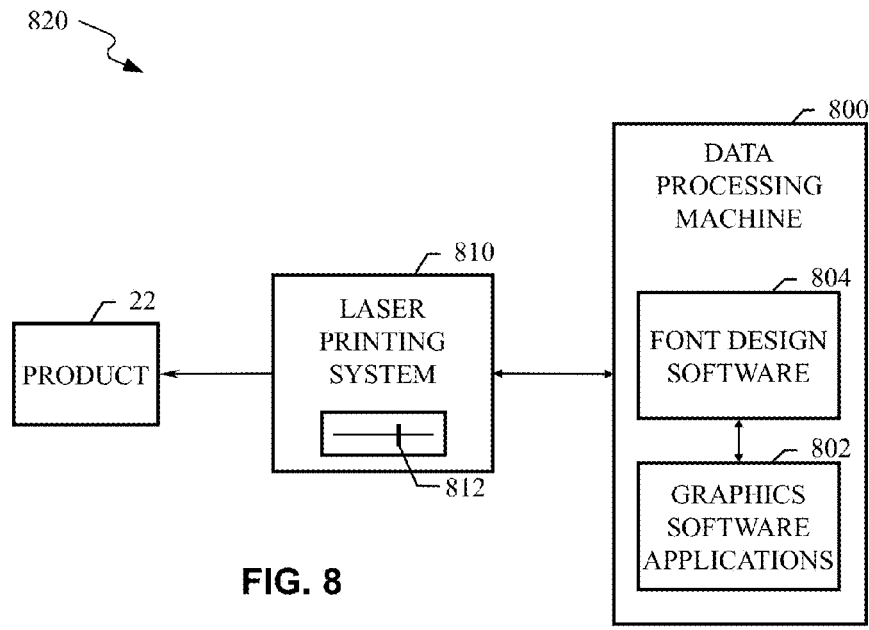
FIG. 8 illustrates an example image printing system 820, including a data processing machine 800, a laser printing system 810, and a product 22 to be marked.

FIG. 8 illustrates an example image printing system 820, including a data processing machine 800, a laser printing system 810, and a product 22 to be marked. The data processing machine 800 may be a personal computer (PC), a laptop or other type of computer with a processor, memory, a hard drive, a display and input components, such as a keyboard and mouse. The data processing machine 800 may include one or more graphics software applications 802, such as Microsoft Paint™, a Windows®-based graphics software, and other software applications, which can be bundled together in a graphics tool set and can be used to transfer laser printable images to the laser printing system 810. The software 802 can include a custom device interface application for a family of laser printer products. The software can be used to create and edit images (e.g., bitmaps). The software can include font design software 804 used to create new fonts for alphanumeric characters.

The software 802 can convert an original image into a printable image, which may be stored locally at the printing system 810. Such images can be printed along with alphanumeric characters, which can be input through the data processing machine 800 or through the user interface 30. The software 802, 804 may be stored on a machine-readable medium, such as a hard drive, a disk, or memory. The software 802 may be incorporated into a printer driver, such as a Microsoft Windows® printer driver. It is to be appreciated that the functional operations described can be incorporated into multiple software products, such as those described, or in a single software product, and multiple operating systems may be used as well.

The laser printing system 810 may have a laser aperture of 2"×4", a spot size of 0.008" and a minimum step time of 150µ seconds. Laser wavelengths and powers may determine the materials that can be marked with images. The laser-based image printing system 820 may use the software 802 to mark any symbol, code, sequence, logo, image or pattern on a product 22. For example, the system 820 may mark alphanumeric codes using the scalable laser fonts as described herein.

The laser printing system 810 can include a user interface 812 to receive a quality setting input. The interface 812 can be a slider graphical user interface (GUI) as shown, or other inputs, such as numerical inputs, categorical inputs, or GUI based continuous value inputs. In addition, quality setting information (e.g., a default quality setting) can be stored in a project file created at the data processing machine 800. The system 820 can employ a user interface system in which a first software application at a computer creates and edits scalable fonts, the computer sends the scalable fonts to the laser electronics (e.g., in a project file), and the laser electronics use the scalable fonts to convert text data to images for the laser to print.

Figure 9:
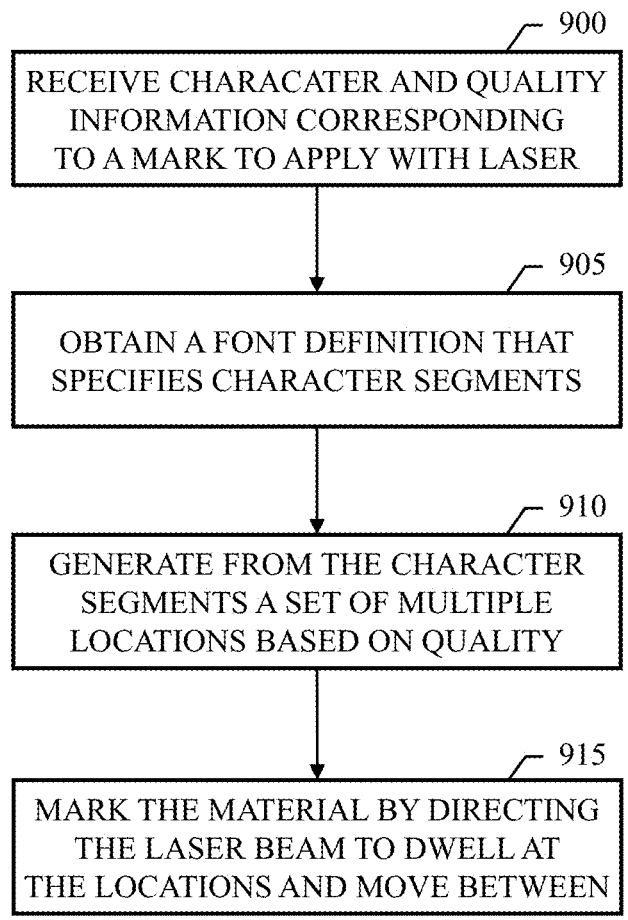
FIG. 9 shows a technique of marking a material using scalable laser fonts.

FIG. 9 shows a technique of marking a material using scalable laser fonts. Character and quality information corresponding to a mark to apply to the material with the laser beam is received 900. This can involve a user specifying the characters to print along with a character size (e.g., in a saved project file). This can also involve the user indicating a quality for the marking project up front (e.g., a default quality setting included in the saved project file) or the user indicating the quality at job run time (e.g., a new quality setting being input in a user interface device associated with the laser on the line). Note that the quality setting can be a directly set value for pixel spacing within the segments, or it can be some value (Boolean, multi-category, or continuous) that indicates print quality generally. A font definition that specifies character segments (e.g., independent of a specific pixel grid) is obtained 905. This can include loading the font definition from memory responsive to a user input indicative of the font definition (e.g., the user selects a saved project file that includes a previously specified font definition). Alternatively, the font definition can be directly input by a user.

A set of multiple spaced locations is generated 910 from the character segments in accordance with the character and quality information. This can include uniformly spacing the locations within the character segments based on a quality setting received from a user (e.g., the value received from a mark quality slider interface provided to the user). For example, the uniform spacing of the locations can use a pixel spacing input from the user to determine where to place the locations for laser dwell within the character segments. Note that the spacing of the locations can also be derived from a quality setting input based on other factors. For example, a particular quality setting can result in a first spacing amount applied within horizontal and vertical straight line segments, a second (more frequent) spacing amount applied within diagonal straight line segments (note that pixel spacing on a diagonal typically needs 40% more laser fluence than in a straight segment of equal length to achieve similar quality), and a third (more infrequent) spacing amount applied within a portion of a line segment that overlaps another line segment of a given character.

In addition, it should be noted that the pixel grid used for converting the character segments to laser dwell locations can itself be selected from a group of available pixel grids based on the quality setting. For example, two pixel grids (32×20 and 64×40) can be made available in some implementations, and the system can select the larger pixel grid when the quality setting is above a threshold value. Alternatively, the multiple pixel grids need not be predefined, but can be generated as needed based on a quality setting value and a character size value.

The determination of what grid size to use can be driven by the laser spot size of the system. The grid should be sufficiently large enough that when marking a diagonal line, adjacent pixels on that line will overlap. For example, with a nominal spot size of 0.18 mm, marking a 2 mm tall by 1.2 mm wide character, an 11×9 font results in vertical spacing of 0.16 mm and horizontal spacing of 0.12 mm. Both are below the nominal spot size. However, pixels on diagonal marks can be spaced as much as 0.22 mm, above this threshold. Increasing the grid size to, e.g., 40×25 eliminates this problem. Another driver in this determination can be the intricacy of a character. More detail typically requires a higher resolution. This can be especially important when marking non-Latin characters, such as Kanji.

Note also that the locations determined for marking using a given pixel grid can themselves correspond to pixels that are larger than the spot diameter of the laser by allowing the laser to mark multiple spots for each location, thus making the pixels larger. This atomization of the marking locations (allowing each pixel to be made larger as desired) can be controlled directly by a user, in some implementations, and can be controlled by the quality setting input, in some implementations.

In any case, the material is marked 915 with the laser beam by directing the laser beam to dwell at the locations and move between the locations without deactivating the laser beam. Thus, a step-and-repeat, variable dwell time laser printing approach can be combined with a font design approach to produce generally uniform fluence across the mark. Note that the term "dwell" in this context means that the laser is at least slowed down as it approaches a specified location to cause a mark to be formed at the location, but need not come to a complete stop; it will be appreciated that the quality setting itself can impact the amount and nature of the dwell time at the locations.

The font definitions (which define the glyphs in segments) can be developed by applying concepts from TrueType and other fonts to the dot matrix laser marking approach. This can be done in a manner that creates uniform dot spacing. Thus, a single font definition can be used to generate multiple step-and-repeat laser sequences that range from low quality dot matrix output to uniform fluence, vector-like quality output.

Figure 10A:
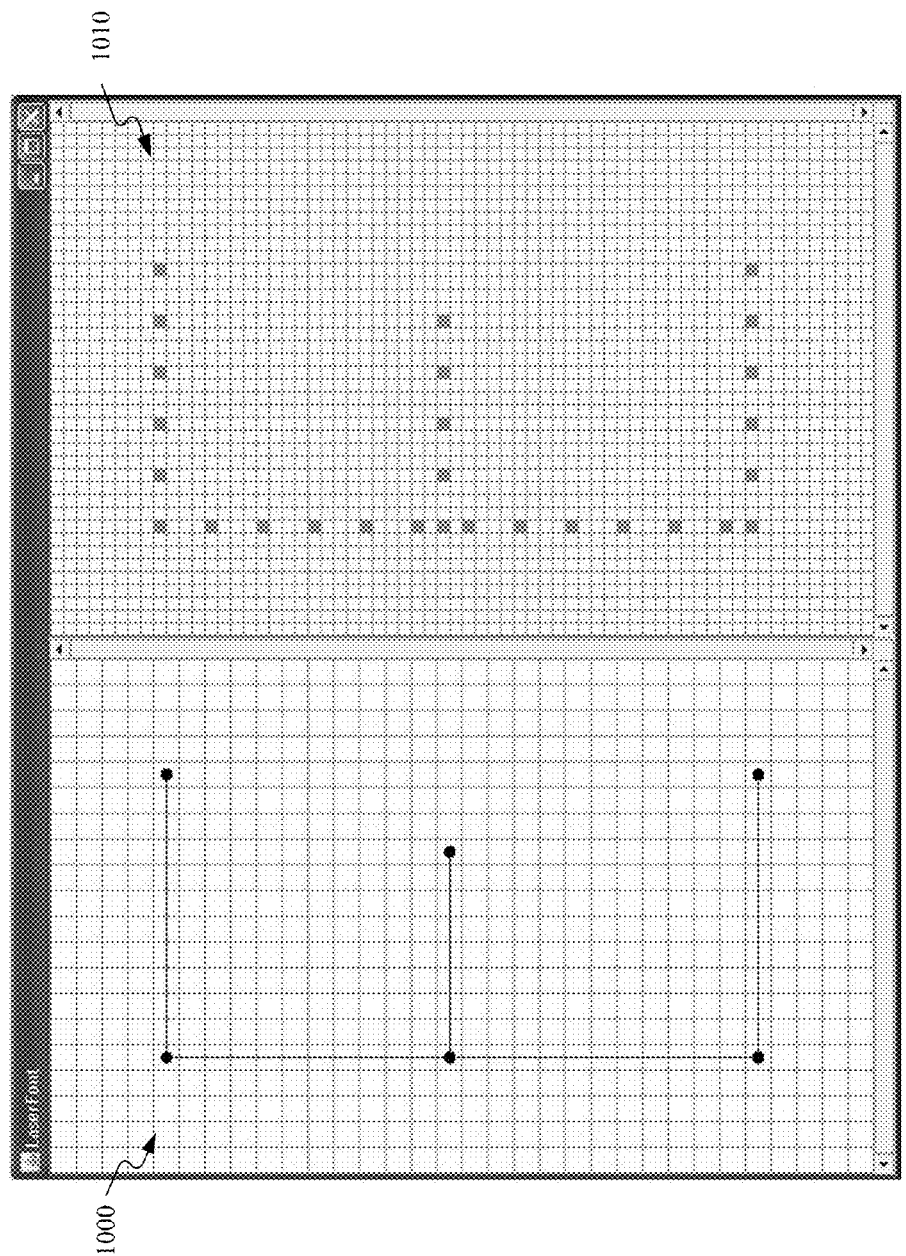
FIGS. 10A-10C show examples of a character rendered according to a scalable laser font.
Figure 10B:
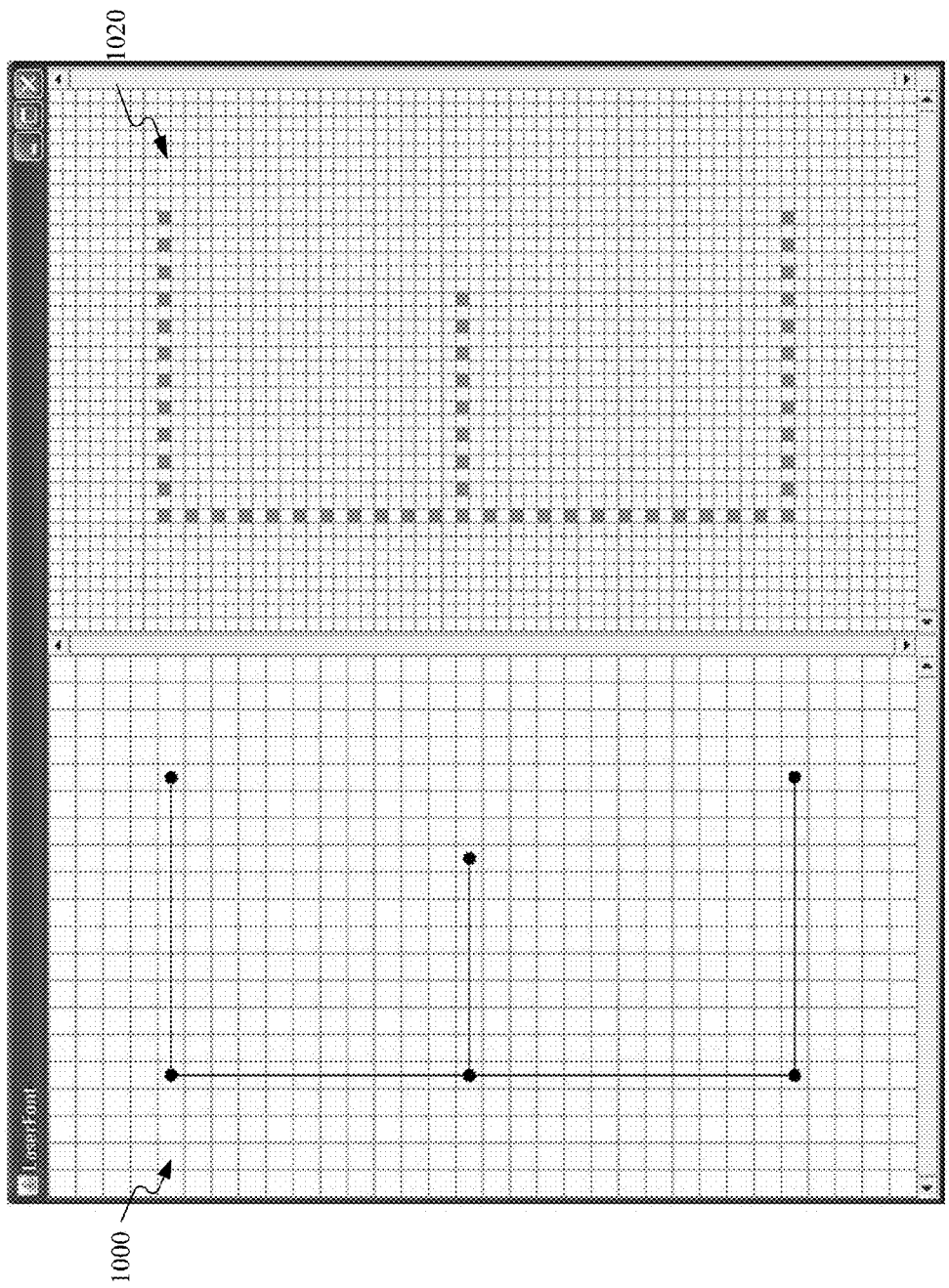
Figure 10C:
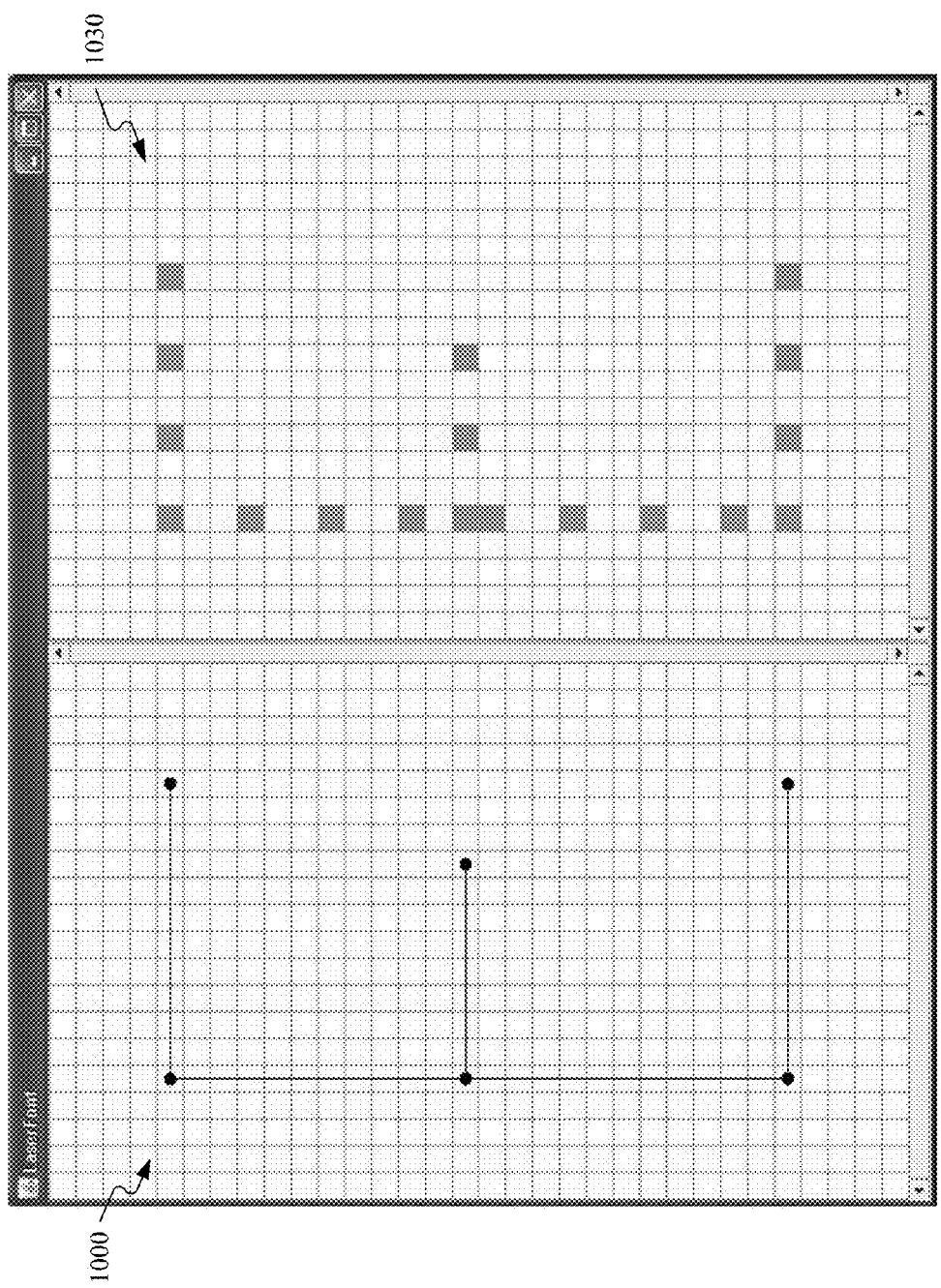

FIGS. 10A-10C show examples of a character rendered according to a scalable laser font. As shown in FIG. 10A, a font definition 1000 for the letter "E" includes four line segments. Based on a quality setting for rendering this character, a 64×40 output grid is selected and marking locations are assigned to every fourth pixel in the 64×40 output grid to result in the set of locations 1010. As shown in FIG. 10B, when the quality setting is increased, the spacing between pixels to mark can be decreased, resulting in the set of locations 1020. As shown in FIG. 10C, when the quality setting is decreased from that shown in FIG. 10A, a 32×20 output grid can be selected instead, and marking locations can be assigned to every third pixel in the 32×20 output grid to result in the set of locations 1030. In addition, the sequencing between the segments can also be specified by the font.

Figure 11:
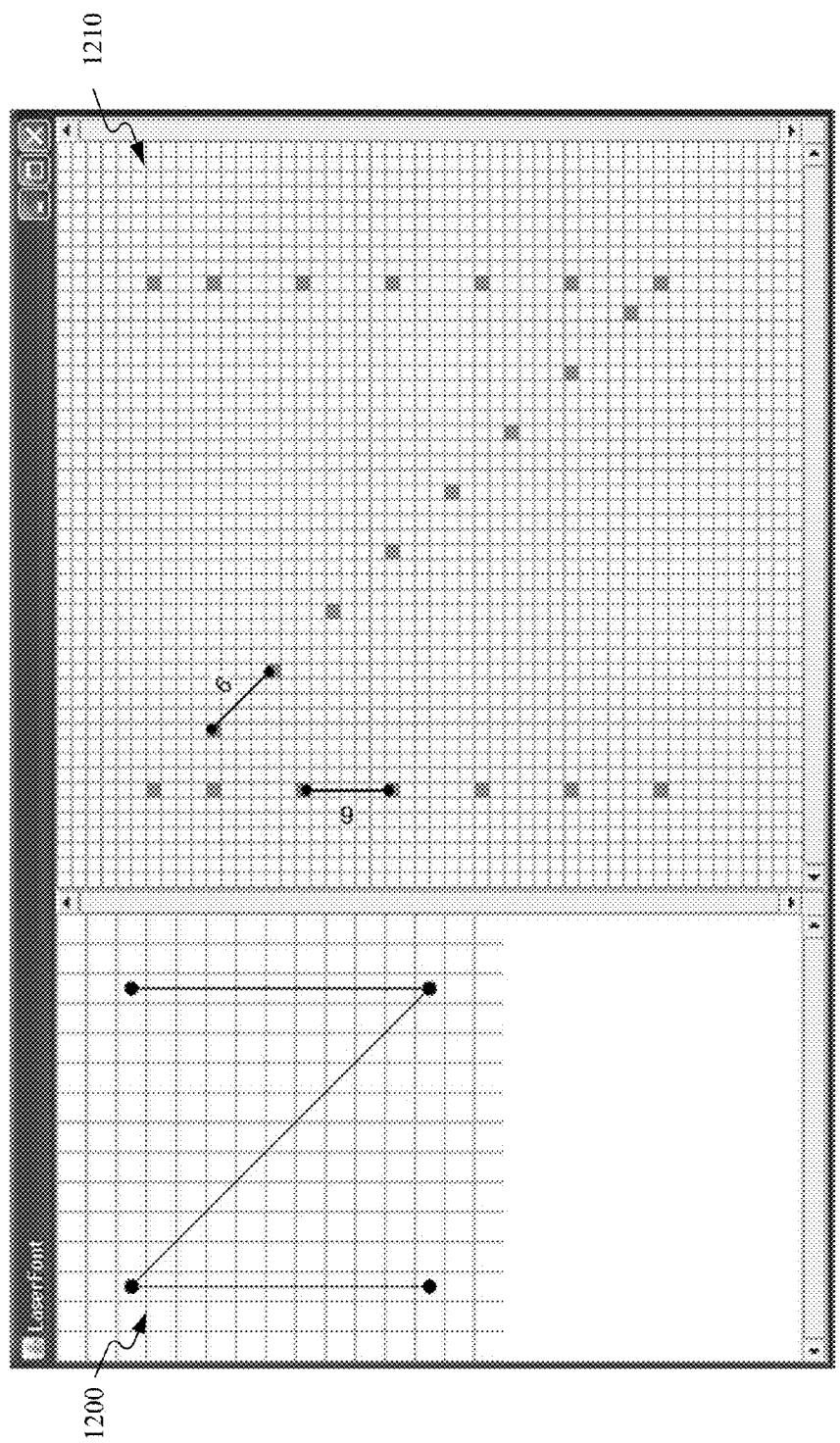
FIG. 11 shows another example of a character rendered according to a scalable laser font.

FIG. 11 shows another example of a character rendered according to a scalable laser font. A font definition 1100 for the letter "N" includes three line segments. Based on a quality setting for rendering this character, a 50×50 output grid is selected and marking locations are assigned to every sixth pixel in the 60×60 output grid for vertical segments, and to every fourth diagonal pixel (corresponding to the same distance of six vertical pixels) for the diagonal segment, to result in the set of locations 1110. Thus, uniform pixel spacing is maintained for the diagonal line. This is accomplished by changing the step sizes of the x and y axes (e.g., the delta y in the vertical segment is 6, but only 4 on the diagonal).

In some of the examples addressed above, non-uniform pixel spacing has been used near character segment intersection points. Criteria for allowing this can be based on a determination of whether the spacing is larger than the nominal spot size. If it is larger, then the non-uniform pixels will not typically create a problem, as the lines will not actually cross. If it is smaller, the pixel at the crossing point can be dropped. Note that minimizing crossing points can be especially important when marking on thin substrates such as film.

In some implementations, the starting and ending points of a character segment can be placed so as to ensure their exact locations, and the remaining pixels can be evenly spaced in between them. This can result in introduction of a small error in the pixel spacing in that the spacing may be slightly larger or smaller than desired, but may nonetheless be preferable in some implementations. In addition, the font definition can include segments that are points, in which case, the laser can be moved to that specified position (scaled to the pixel grid) and held (or slowed down) there for the duration of the dwell time.

Furthermore, in some implementations, the font definition can include segments that are curves. A curve (such as a cubic Bezier curve) can be approximated by joining a series of straight line segments. Several techniques are available, such as de Castlejau's algorithm (see http:-www.antigrain.com-research-adaptive_bezier-index.htm). Once broken into straight line segments, at the appropriate resolution for a given pixel grid, these can be processed as other straight line segments are. This helps primarily when scaling a character, where the straight line segments are derived from each curve segment to give the appearance of a curve at any size the character is scaled to.

Thus, a laser coding system can be designed to allow the user to design a code consisting of one or more characters in which the user may specify the font, size, and quality of each of the characters in the code. The font determines the general shape of the characters. The quality setting can determine the uniform spacing of the pixels that make up the characters. At a low quality setting, the characters are made up of widely spaced pixels. As the user increases the quality, the number of pixels increases, but because the character size remains the same, the pixels are closer together. At some point (determined by the nominal spot size of the laser beam and the substrate's response to the laser), the pixels will begin to overlap on the substrate. This point defines the high-quality threshold. At and above this threshold, the print no longer appears to be a dot matrix print, but has a quality similar to a vector marking system. Unlike other dot matrix laser marking systems, the same font may be used to print characters of different sizes and quality.

Although the present application has been described in detail, it should be understood that various changes, combinations, substitutions and alterations can be made without departing from the spirit and scope of the application as described by the appended claims.

What is claimed is:

1. A method of marking on a material with a laser beam, the method comprising:
   receiving user-specified characters for a mark to be applied to the material with the laser beam;
   obtaining a quality setting;
   loading a pre-defined font definition from a machine-readable medium, wherein the pre-defined font definition specifies character segments for each of multiple character fonts, and the specified character segments comprise horizontal and vertical line segments, diagonal line segments, and curve segments;
   selecting a pixel grid from a group of available pixel grids of different grid sizes based on the quality setting;
   generating a set of multiple spaced locations in the selected pixel grid based on character segments of the pre-defined font definition that correspond to the user-specified characters; and
   marking the material with the laser beam by directing the laser beam to dwell at the locations and move between the locations without deactivating the laser beam.

2. The method of claim 1, wherein the user-specified characters and the pre-defined font definition are stored in a saved project file that also includes a default quality setting, and obtaining the quality setting comprises receiving the quality setting through a user interface to enable speed versus print quality tradeoffs for a given laser marking project run.

3. The method of claim 1, wherein selecting the pixel grid is further based on a character size value.

4. The method of claim 1, wherein generating the set of multiple spaced locations comprises, in accordance with the quality setting:
   applying a first spacing amount between locations within horizontal and vertical line segments; and
   applying a second spacing amount between locations within diagonal line segments;
   wherein the second spacing amount is more frequent than the first spacing amount.

5. The method of claim 4, wherein generating the set of multiple spaced locations comprises:
   applying a third spacing amount between locations within a portion of a line segment that overlaps another line segment of a given character;
   wherein the third spacing amount is more infrequent than the first spacing amount.

6. The method of claim 4, comprising:
   breaking each curve segment into straight line segments at an appropriate resolution for the selected pixel grid; and
   processing the straight line segments as other straight line segments are processed.

7. The method of claim 1, wherein generating the set of multiple spaced locations comprises:
   placing starting and ending points for at least one character segment at exact locations; and
   evenly spacing remaining locations for the at least one character segment in between the exact locations of the starting and ending points.

8. A non-transitory machine-readable medium storing program instructions that when run by a computer cause the computer to perform operations comprising:
   receiving user-specified characters for a mark to be applied to a material with a laser beam;
   obtaining a quality setting;
   loading a pre-defined font definition, wherein the pre-defined font definition specifies character segments for each of multiple character fonts, and the specified character segments comprise horizontal and vertical line segments, diagonal line segments, and curve segments;
   selecting a pixel grid from a group of available pixel grids of different grid sizes based on the quality setting;
   generating a set of multiple spaced locations in the selected pixel grid based on character segments of the pre-defined font definition that correspond to the user-specified characters; and
   marking the material with the laser beam by directing the laser beam to dwell at the locations and move between the locations without deactivating the laser beam.

9. The non-transitory machine-readable medium of claim 8, wherein the user-specified characters and the pre-defined font definition are stored in a saved project file that also includes a default quality setting, and obtaining the quality setting comprises receiving the quality setting through a user interface to enable speed versus print quality tradeoffs for a given laser marking project run.

10. The non-transitory machine-readable medium of claim 8, wherein selecting the pixel grid is further based on a character size value.

11. The non-transitory machine-readable medium of claim 8, wherein generating the set of multiple spaced locations comprises, in accordance with the quality setting:
   applying a first spacing amount between locations within horizontal and vertical line segments; and
   applying a second spacing amount between locations within diagonal line segments;
   wherein the second spacing amount is more frequent than the first spacing amount.

12. The non-transitory machine-readable medium of claim 11, wherein generating the set of multiple spaced locations comprises:
   applying a third spacing amount between locations within a portion of a line segment that overlaps another line segment of a given character;
   wherein the third spacing amount is more infrequent than the first spacing amount.

13. The non-transitory machine-readable medium of claim 11, the operations comprising:
   breaking each curve segment into straight line segments at an appropriate resolution for the selected pixel grid; and
   processing the straight line segments as other straight line segments are processed.

14. The non-transitory machine-readable medium of claim 8, wherein generating the set of multiple spaced locations comprises:
   placing starting and ending points for at least one character segment at exact locations; and
   evenly spacing remaining locations for the at least one character segment in between the exact locations of the starting and ending points.

15. A system to mark on a material with a laser beam, the system comprising:
   a laser operable to produce the laser beam;
   an optics assembly operable to focus and direct the laser beam; and
   one or more machines coupled with the laser and the optics assembly and operable to (i) receive user-specified characters for a mark to be applied to the material with the laser beam, (ii) obtain a quality setting, (iii) load a pre-defined font definition, wherein the pre-defined font definition specifies character segments for each of multiple character fonts, and the specified character segments comprise horizontal and vertical line segments, diagonal line segments, and curve segments, (iv) select a pixel grid from a group of available pixel grids of different grid sizes based on the quality setting, (v) generate a set of multiple spaced locations in the selected pixel grid based on character segments of the pre-defined font definition that correspond to the user-specified characters, and (vi) mark the material with the laser beam by directing the laser beam to dwell at the locations and move between the locations without deactivating the laser beam.

16. The system of claim 15, where the one or more machines include a memory, the user-specified characters and the pre-defined font definition are stored in a saved project file that also includes a default quality setting, and the quality setting is received through a user interface of the system to enable speed versus print quality tradeoffs for a given laser marking project run.

17. The system of claim 15, wherein the one or more machines select the pixel grid further based on a character size value.

18. The system of claim 15, wherein the one or more machines are operable to apply a first spacing amount between locations within horizontal and vertical line segments, and apply a second spacing amount between locations within diagonal line segments, wherein the second spacing amount is more frequent than the first spacing amount.

19. The system of claim 18, wherein the one or more machines are operable to apply a third spacing amount between locations within a portion of a line segment that overlaps another line segment of a given character, wherein the third spacing amount is more infrequent than the first spacing amount.

20. The system of claim 18, wherein the one or more machines are operable to break each curve segment into straight line segments at an appropriate resolution for the selected pixel grid, and process the straight line segments as other straight line segments are processed.

21. The system of claim 15, wherein the one or more machines are operable to place starting and ending points for at least one character segment at exact locations, and evenly space remaining locations for the at least one character segment in between the exact locations of the starting and ending points.

* * * * *